United States Patent [19]

King

[11] Patent Number: 5,094,204
[45] Date of Patent: Mar. 10, 1992

[54] STRATIFIED CHARGE INJECTION FOR GAS-FUELED ROTARY ENGINES

[75] Inventor: Steven R. King, San Antonio, Tex.

[73] Assignee: Gas Research Institute, Chicago, Ill.

[21] Appl. No.: 515,949

[22] Filed: Apr. 27, 1990

[51] Int. Cl.$^5$ ............................................. F02B 53/12
[52] U.S. Cl. ..................................... 123/205; 123/219
[58] Field of Search ................. 123/205, 206, 208, 219

[56] References Cited

U.S. PATENT DOCUMENTS

| | | | |
|---|---|---|---|
| 3,136,302 | 6/1964 | Nallinger et al. | 123/208 |
| 3,174,466 | 3/1965 | Scherenberg | 123/8 |
| 3,196,847 | 7/1965 | Kimberley et al. | 123/8 |
| 3,589,344 | 6/1971 | Steinke | 123/8 |
| 3,867,910 | 2/1975 | Galonska | 123/8 |
| 3,886,907 | 6/1975 | Loyd, Jr. | 123/219 |
| 3,960,115 | 6/1976 | Lamping et al. | 123/8 |
| 3,991,723 | 11/1976 | Myers | 123/8 |
| 4,019,471 | 4/1977 | Shimoji et al. | 123/8 |
| 4,084,548 | 4/1978 | Sasakura et al. | 123/205 |
| 4,572,122 | 2/1986 | Kamai et al. | 123/206 |
| 4,889,091 | 12/1989 | Berkowitz et al. | 123/219 |

FOREIGN PATENT DOCUMENTS 2540702  3/1977  Fed. Rep. of Germany ...... 123/205

OTHER PUBLICATIONS

Society of Automotive Engineers, "An Update of the Direct Injection Stratified Charge Rotary Combustion Engine", Charles Jones et al., IAE Congress, Feb. 28--Mar. 4, 1977.

Society of Automotive Engineers, "Development of a Natural Gas Stratified Charge Rotary Engine", R. Sierens et al., IAE Congress, Feb. 25-Mar. 1, 1985.

Primary Examiner—Leonard E. Smith
Attorney, Agent, or Firm—Fulbright & Jaworski

[57] ABSTRACT

A gaseous fuel injector injects fuel directly into a working chamber of a rotary combustion engine after the end of the air intake stroke and early during the compression stroke for providing fuel-charge stratification within the working chamber as the rotor approaches and reaches compression top dead center. This results in an increase in power output and brake thermal efficiency due to reduced displacement of the intake air, reduced exhaust emissions levels due to reduced unburned hydrocarbons along the sides and trailing edge of the rotor, and reduced tendancy for combustion knock due to a non-combustible mixture in the end gas.

5 Claims, 2 Drawing Sheets

STRATIFIED CHARGE INJECTION FOR GAS-FUELED ROTARY ENGINES

BACKGROUND OF THE INVENTION

The present invention is directed to a gas-fueled rotary combustion engine in which a gaseous fuel charge is injected after the intake air port closes and early in the compression stroke for providing a fuel-charge stratification. This provides the advantages of increased thermal efficiency and volumetric efficiency, reduced exhaust emissions levels, and less tendency to detonate than a homogeneous charged engine.

In general rotary combustion engines have not been able to achieve brake thermal efficiencies as high as that of reciprocating engines. The two primary reasons for this lower efficiency are the rotary's large surface area-to-volume ratio of the combustion chamber and the long cycle time (1.5 times that of the reciprocating engine). Both these factors increase the amount of heat energy lost during combustion. The large surface area-to-volume ratio (a result of the long rectangular shaped chamber) also increases the time required to burn the mixture since the flame has farther to burn and increases the amount of unburned end gas in the combustion chamber. A lean fuel mixture is desirable because it facilitates high thermal efficiency, but at the same time it slows the burn rate which counteracts the benefits of lean burn efficiency.

Based on these rotary engine characteristics, a method is needed which will allow the engine to operate at lean overall fuel-air ratios (to attain high thermal efficiency) while maintaining, or even increasing, the burning rate of the fuel. Ideally a stratified fuel charge which is rich near the spark plugs and lean around the perimeter of the chamber is desired. This will keep the initial burning rate high due to a rich local mixture around the spark plugs and eliminate the unburned gas near the edges of the chamber.

The present invention is directed to achieving improved thermal efficiency and lowered exhaust emissions in a rotary combustion engine through fuel-charge stratification by injecting the gaseous fuel after the intake port closes for providing a stratified charge at combustion.

SUMMARY

The present invention is directed to a stratified charge injection for gas-fueled rotary engines having an air intake stroke, a compression stroke, a power stroke and an exhaust stroke. The engine includes a housing configuration having an air intake port(s) and an exhaust port and an outer perimeter with a rotor rotatable in the rotor housing. A gaseous fuel injector is connected to the housing between 270° and 360° of the rotor rotation after compression top dead center. In addition, the injector is located downstream of the air intake port(s). The injector provides gaseous fuel at a pressure less than peak compression pressure and the injector is located in the middle of the width of the outer perimeter housing. Spark ignition means are provided in the housing downstream of the injector.

Yet a still further object of the present invention is wherein the gaseous fuel injector includes a check valve.

Still a further object of the present invention is the provision of second spark ignition means in the housing downstream of the first spark emission means.

A further object of the present invention is wherein the injector injects gaseous fuel early in the compression stroke which results in a rich fuel mixture at the leading edge of the rotor flank and a lean mixture at the trailing area of the rotor.

Yet a still further object of the present invention is wherein in one embodiment the air intake port is open from a rotor angle of approximately 192° to 282° after compression top dead center and the gaseous fuel injector means is open after the air intake port is closed and is open from a crankshaft angle of approximately 282° to 329° after compression top dead center.

Further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
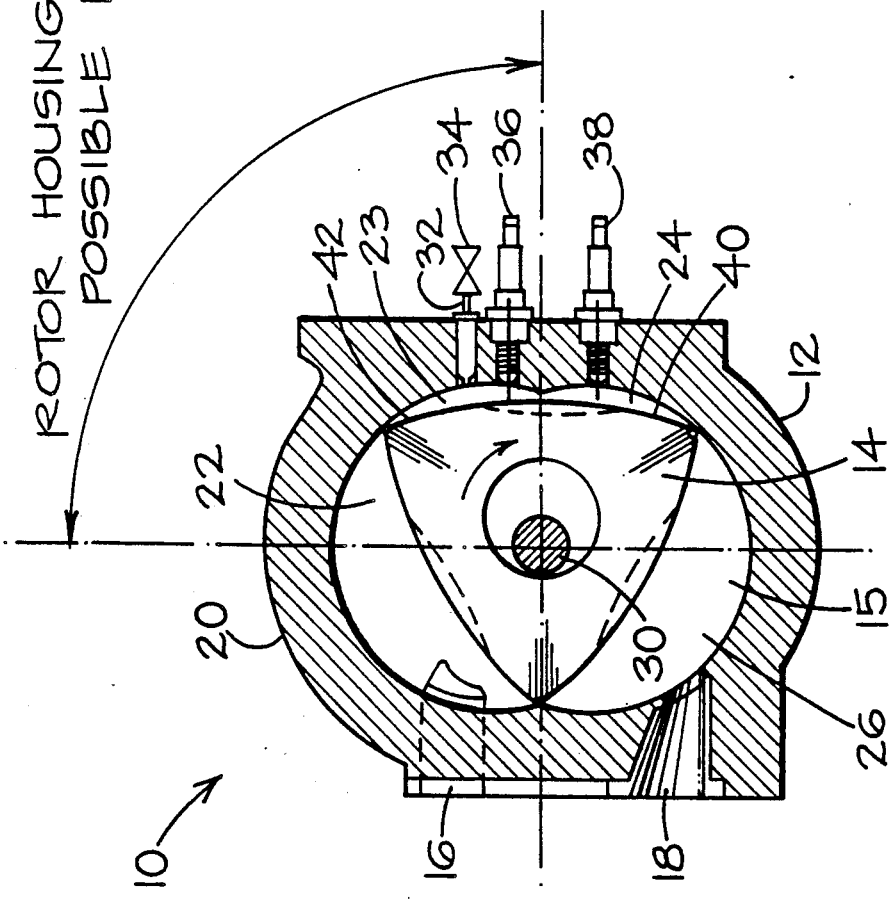
FIG. 1 is a schematic elevational view of a cross section, illustrating a gaseous fuel rotary combustion engine of the present invention.

Referring now to the drawings and particularly to FIG. 1, the reference numeral 10 generally indicates the gaseous fueled rotary combustion engine of the present invention and generally includes a rotor housing 12 having a chamber 15 and a rotor 14 rotatable therein. The rotor housing 12 includes an air intake port 16 and an exhaust port 18 and an outer perimeter 20. The ports 16 and 18 may be side or peripheral ports as desired. As is conventional, the engine 10 includes an air intake stroke in chamber portion 22, a compression stroke in chamber 23, a power stroke in chamber portion 24, and an exhaust stroke in chamber portion 26 of the chamber 15. A crankshaft 30 is geared to the rotor 15, such as by a three to one ratio whereby the crankshaft turns 3°, while the rotor 14 is only turning 1°.

The above-description of a rotary internal combustion engine is generally conventional. However, conventional naturally-aspirated rotary engines operate on a homogeneous mixture using gaseous fuels (natural gas and its constituents) and produce less power than the same engine operated on a liquid fuel because the gaseous fuel displaces intake air which reduces intake air flow and effectively decreases the apparent size of the engine. That is, a reduction in air flow means a reduction in power output.

The present invention is directed to an engine 10 wherein gaseous fuel is introduced directly into a compression chamber 23 during the compression stroke of the rotary combustion engine 10 after the end of the intake stroke in the chamber portion 22. The fuel is injected early in the compression stroke in a manner and location which produces fuel-charge stratification within the compression chamber 23 as the rotor 14 approaches and reaches compression top dead center. The result of this stratification is an increase in power output due to reduced displacement of the intake air by the gaseous fuel during the intake process and reduced HC and NOx exhaust emissions. That is, injection of the gaseous fuel after the air intake process is complete will eliminate the power loss normally associated with operation on gaseous fuels. The exact location of the gaseous fuel injection is dependent upon the intake port 16 timing of the specific engine, but in general is located in the rotor housing 12 between 270° and 360° rotation of the rotor after compression top dead center, or between 810° and 1,080° rotation of the crankshaft 30, and in the middle of the width of housing 12.

Therefore, a fuel injection nozzle 32 is connected to the housing 12 downstream of the air intake port 16 through which a gaseous fuel, such as natural gas, is supplied through a check valve 34. Gaseous fuel is supplied through the injection nozzle 32 at a relatively low pressure (less than the peak compression pressure in the combustion stroke chamber portion 23), such as zero to 100 psi depending upon the engine load. Therefore, when the compression pressure in the chamber portion 23 increases to the magnitude of the fuel supply pressure, the subsequent injection of gaseous fuel is stopped during the compression stroke. The one-way check valve 34 prevents reverse flow of the fuel into the fluid supply line during late compression or combustion events. The fuel delivery pressure to the nozzle 32 can be referenced to the intake port 16 pressure to compensate for varying load conditions of the engine 10. Fuel flow can be controlled either mechanically or electronically to maintain the proper fuel-air ratio in the engine.

Spark ignition means such as a first spark plug 36 and/or second spark plug 38 may be provided downstream of the injector 32 for igniting the stratified charge in the power chamber 24.

This gaseous fuel injection process stratifies the fuel in three directions within the working chamber. Fuel depth stratification (stratification between the rotor 14 and rotor housing 12) is accomplished by controlling the angle (here shown as 90° to chamber 15) and the depth of the fuel charge penetration into the compression chamber 23 during injection, this being a function of the jet velocity and the momentum flux of the fuel injection discharge. The location of the fuel injector 32, in the middle of the rotor housing perimeter 20 width, combined with the unidirectional air flow established in the compression chamber 23 during the compression stroke provides fuel stratification in the axial direction of the rotor. An important aspect of this fuel stratification method is based on the fact that since the fuel is injected far downstream of the air intake port 16 the air turbulence caused by the intake port 16 has substantially diminished and unidirectional air flow exists in the direction of rotor rotation. Fuel stratification in the tangential direction to the rotor 14 is obtained as the pressure in the working chamber increases during compression, thus stratifying the fuel charge from the leading flank 40 to the trailing flank 42 of the rotor 14 (rich at the leading flank 40, lean or no fuel at the trailing flank 40). The area of highest (richest) fuel concentration is located at the leading spark plug 38 area which is ideal for initiation of combustion. The areas of lowest (leanest) fuel concentration are around the perimeter of the combustion chamber space and near the trailing flank 42 of the rotor 14, thus eliminating incomplete and inefficient combustion which normally takes place in these areas in a homogeneous charge rotary engine. The result is lowered hydrocarbon emissions, lowered NOx emissions, increased thermal efficiency, and increased power output.

Figure 2:
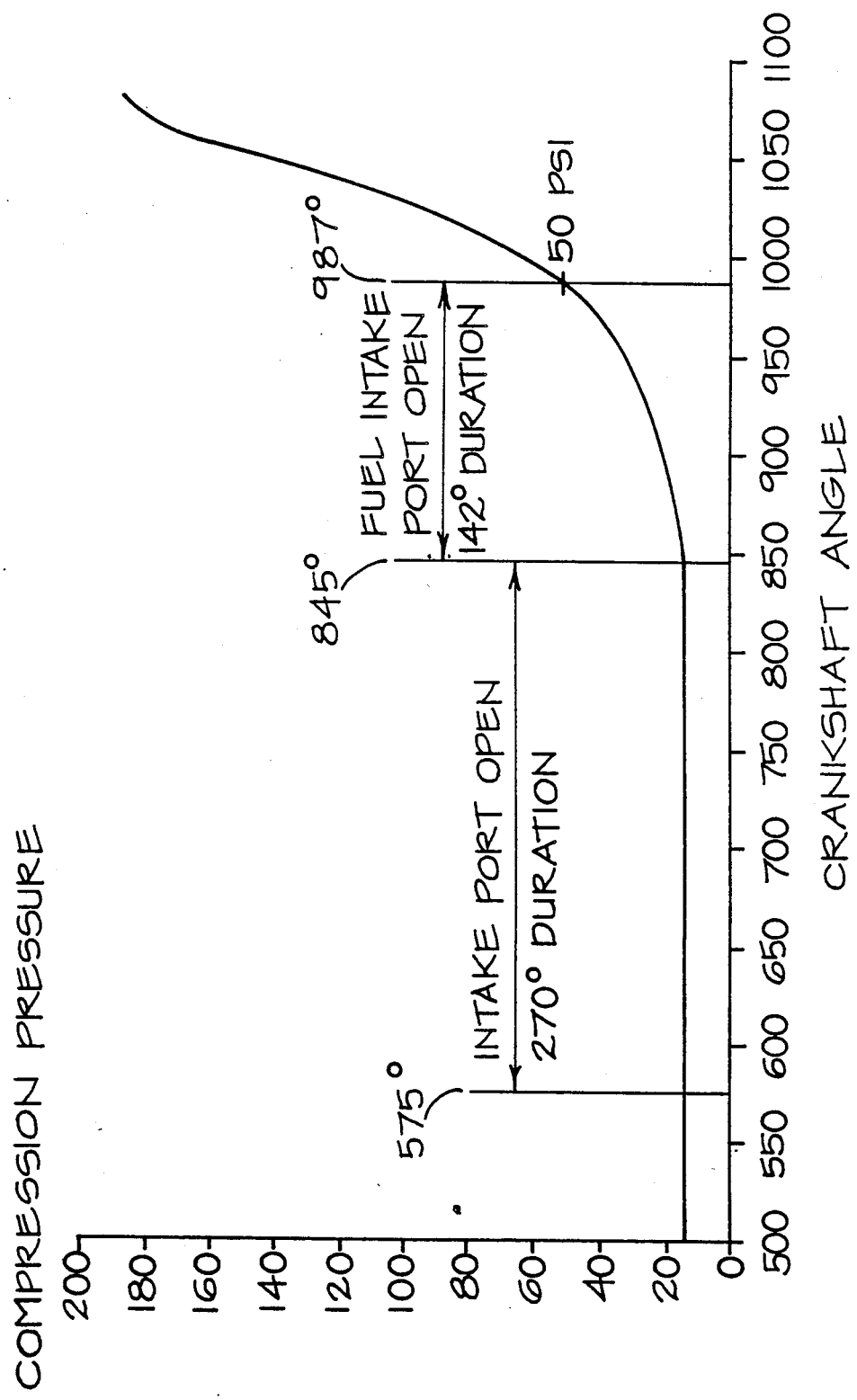
FIG. 2 is a chart of compression pressure versus crankshaft angle (which is three times the rotor angle) for the pressure in the working chamber during intake and compression strokes for one particular embodiment of the present invention.

A computer model was created and used to evaluate the present invention in which the analysis was designed to represent a Mazda 13B rotary engine. In comparison to a naturally-aspirated 13B rotary engine, a significant increase in volumetric efficiency can be achieved by eliminating the introduction of gaseous fuel during the intake cycle. Assuming, then, that natural gas injection after the closing of the intake port is desirable in terms of improving volumetric efficiency, the question arises: Can sufficient amounts of natural gas be injected without resorting to pressurizing the fuel supply pressure above 50 psi? (50 psi is a nominal pipeline supply pressure from the utility company useful for stationary engines). FIG. 2 is a graphical representation of the pressure in the chamber 23 from intake through compression for 100% volumetric efficiency. From this curve we see that a total of 412° of crankshaft angle is available for injection of natural gas at under 50 psi. However, during all but 142° of that time the intake port is open as well. That leaves approximately 142° of crankshaft angle to inject natural gas at under 50 psi. Calculations indicate that with a 50 psi supply pressure, a ¼-inch orifice will allow sufficient fuel to enter the engine to obtain relatively high power operation. It is proposed that the positioning of the fuel injection hole be located at the trailing spark plug 36 location. This location leaves the gas injection hole covered until the intake port 16 is closed. A simple check valve 34 at this location would prevent the mixture from flowing back into the system when in-chamber pressure rise above 50 psi.

Review of the modeling data indicates that the flow fields within the rotary engine 10 are conducive to fuel stratification and the optimum location for the fuel injector 32 would be at the trailing spark plug location, downstream from the intake port 16 and during the early part of the compression stroke. It is estimated with the fuel injector at this point sufficient improvement in both volumetric efficiency and fuel stratification can be achieved to result in a 4 point increase in thermal efficiency. Some means of inducing mixture turbulence into the combustion chamber 24 to increase the burning rate and make use of the excess air may be required to obtain the full benefit of the lean-burn stratified-charge engine process. Perhaps the easiest method of accomplishing this would be with a small turbulence by-chamber (not shown) mounted in the combustion space 24 of the rotor housing 12.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A stratified charge injection for gas-fueled rotary engines having an air intake stroke, a compression stroke, a power stroke, and an exhaust stroke, comprising, a rotor housing, said housing including an air intake port and an exhaust port, and an outer perimeter,
a rotor rotatable in the housing, a gaseous fuel injector supplying all of the fuel is connected to the housing between 270° and 360° of the rotor rotation after compression top dead center and downstream of the air intake port, said injector providing gaseous fuel at a pressure less than peak compression pressure, said injector located in the middle of the width of the outer perimeter of the housing, spark ignition means in the housing downstream of the injector, and means connected to the fuel injector responsive to the compression pressure for controlling the rate and duration of fuel injection.

2. The apparatus of claim 1 wherein the means controlling the fuel injection include a check valve.

3. The apparatus of claim 1 including a second spark ignition means in the housing downstream of the first spark ignition means.

4. The apparatus of claim 1 wherein the injector injects gaseous fuel early in the compression stroke.

5. The apparatus of claim 1 wherein the air intake port is open from a rotor angle of approximately 192° to 282°, and the gaseous fuel injector means is opened after the air intake port is closed and is open from a rotor angle of approximately 282° to 329°.

* * * * *